(12) United States Patent
Daniel et al.

(10) Patent No.: US 10,055,469 B2
(45) Date of Patent: Aug. 21, 2018

(54) METHOD AND SOFTWARE FOR RETRIEVING INFORMATION FROM BIG DATA SYSTEMS AND ANALYZING THE RETRIEVED DATA

(71) Applicant: Amdocs Development Ltd., Limassol (CY)

(72) Inventors: Amit Daniel, Tel Mond (IL); Miriam Duenias, Tel Aviv (IL); Dana Arditi, Modiin (IL)

(73) Assignee: AMDOCS DEVELOPMENT LTD., Limassol (CY)

( * ) Notice: Subject to any disclaimer, the term of this patent is extended or adjusted under 35 U.S.C. 154(b) by 654 days.

(21) Appl. No.: 14/557,820

(22) Filed: Dec. 2, 2014

(65) Prior Publication Data

US 2016/0154865 A1 Jun. 2, 2016

(51) Int. Cl.
*G06F 17/30* (2006.01)

(52) U.S. Cl.
CPC .............................. *G06F 17/30563* (2013.01)

(58) Field of Classification Search
CPC ......... G06F 17/30563; G06F 17/30528; G06F 9/5072; G06Q 10/0631
USPC ....................................................... 707/602
See application file for complete search history.

(56) References Cited

U.S. PATENT DOCUMENTS

| | | | |
|---|---|---|---|
| 2008/0208670 A1* | 8/2008 | Goldszmidt et al. | 705/8 |
| 2014/0229514 A1* | 8/2014 | Shazly | 707/812 |
| 2016/0182607 A1* | 6/2016 | Pan | 707/104 |

OTHER PUBLICATIONS

Cohen et al., MAD Skills: New Analysis Practices for Big data, Aug. 2009, ACM, 1481-1492.*
Suresh, Bird's Eye View On "Big Data Management", 2014, IEEE, 5 pages.*

\* cited by examiner

*Primary Examiner* — Jean B Fleurantin
(74) *Attorney, Agent, or Firm* — Zilka-Kotab, P.C.

(57) ABSTRACT

A method is provided for enabling a software user to obtain answers based on information retrieved from Big Data systems to a query defined by a user. The method comprises: a) providing a software that comprises computational models, wherein each of the computational models is configured to provide answers to a different type of a user query, and at least one of the computational models is further configured to retrieve information from one or more Big Data systems; b) upon inputting the user query to the software, retrieving information from Big Data systems and presenting to the user a pre-determined series of queries and the results thereof, thereby reflecting to the user a multi-step process selected by the software for retrieving the answers to the query defined, based on information retrieved from the Big Data systems.

7 Claims, 1 Drawing Sheet

METHOD AND SOFTWARE FOR RETRIEVING INFORMATION FROM BIG DATA SYSTEMS AND ANALYZING THE RETRIEVED DATA

TECHNICAL FIELD

The present invention relates to methods and systems for determining business trends and in particularly but not exclusively, the present invention relates to methods and systems to enable a user to define a query that relates to business trends and to receive an answer for that query based on market analysis.

BACKGROUND

Nowadays, there is an increasing use of big data systems. The term "big data" as used herein throughout the specification and claims is used to denote a term encompassing any collection of data sets so large and complex that it becomes difficult to process the information by using traditional data processing applications. The challenges include among others analysis, capture, search, sharing, storage, transfer, etc. The trend to use larger data sets results from the fact that the additional information derivable from analysis of a single large set of related data, as compared to separate smaller sets with the same total amount of data, allows finding correlations to spot business trends, and the like.

The use of big data systems regularly encounter limitations due to the large data sets used. These limitations also affect Internet search, finance and business informatics. Data sets grow in size in part because they are increasingly being gathered by ubiquitous information-sensing mobile devices, software logs, cameras, microphones, radio-frequency identification readers (RFID), and wireless networks. The world's technological per-capita capacity to store information has roughly doubled every 40 months since the 1980's as of 2012.

Big data systems is difficult to work with using most relational database management systems and desktop statistics and visualization packages, which require instead massive parallel software running on tens, hundreds, or even thousands of servers. The term "big data" varies depending on the capabilities of the organization managing the set, and on the capabilities of the applications that are traditionally used to process and analyze the data set in its domain.

In addition, different departments in various organizations such as marketing, business development, strategic planning, etc. need to utilize information that is available to them in order to better understand and analyze expected trends in their business and how to promote their business. Typically, the information is available both as internal information (stored at the organization's database) and from external sources. Typical tools currently available, are, platforms to enable big data mining, Data Warehouse (DWH), various Business Intelligence (BI) tools, and the like. However, these tools are infrastructural tools, which are typically used by IT people, but are not adapted to enable in depth investigation nor to provide conclusions that can be used by marketing people or business development people to improve their business.

Some of the drawbacks associated with the currently available solutions are:
1. They are not suitable to identify the business problems. More specifically, they are able to provide out of the box concrete answers to specific business problems in an actionable manner and are typically concerned with processing non-aggregated data. In order to overcome at least partially these disadvantages, the person who seeks the answers needs to draft the proper queries that relate to the existing products, the available technologies, etc., and then to hand them over to the BI department so that they can be converted into queries that fit the interface with the available data mining software and then collect the relevant data, that can be followed by building a model that would provide the required information.
2. The existing solutions do not include a continuous update of the models, a fact that leads to a situation where the models might become irrelevant for marketing use within a too short period of time.
3. Longer time to market periods due to the inability of the marketing people to promptly react to changes that occur in the dynamic market at which they operate.
4. Most of the existing solutions rely on information retrieved from specific information sources at the organization and do not take into account information that is available from additional external sources.

The changes which the telecommunication market has been experiencing in last years, create a lot of pressure on the various companies to find new sources for income and to do so, they need to rely on one of their assets, namely their customers and the vast amount of information that has been gathered within the company on their activities.

SUMMARY OF THE DISCLOSURE

The disclosure may be summarized by referring to the appended claims.

It is an object of the present invention to provide methods and software for determining business trends and opportunities based on data retrieved from big data systems.

It is another object of the present invention to provide methods and software for determining the variables which should be used in order to define questions in the process of providing an answer to a target set by a user.

It is still another object of the present invention to provide methods and software to enable providing answers to targets set by the users under real time (or at least near real time) conditions, while retrieving data from big data systems.

Other objects of the present invention will become apparent as the description of the invention proceeds.

According to one embodiment, there is provided a method for enabling a software user to obtain one or more answers based on information retrieved from one or more Big Data systems to a query defined by a user, said method comprises the steps of:
  a) providing a software that comprises a plurality of computational models, wherein one or more of the plurality of computational models is configured to provide one or more answers to a different type of a user query, and each of the plurality of computational models is further configured to retrieve information from Big Data systems;
  b) upon inputting the user query to the software, retrieving information from one or more Big Data systems and presenting to the user a plurality of pre-determined series of queries and the results thereof, thereby reflecting to the user a multi-step process selected by the software for retrieving the one or more answers to the query defined by that user based on information retrieved from the one or more Big Data systems.

According to another embodiment, the information retrieved from one or more Big Data systems comprises data that relates to activities of a plurality of users at the Internet, and/or data that relates to details of voice calls or text messages associated with a plurality of users.

In accordance with another embodiment, the query is directed to one or more marketing aspects of the user's commercial business.

By yet another embodiment, the method provided further comprising a step of selecting one or more classifying parameters for retrieving and/or processing the information from the one or more Big Data systems.

According to still another embodiment, the retrieval of information from the one or more Big Data systems and processing the retrieved information for presenting to the user the plurality of pre-determined series of queries and the results thereof, is carried out essentially under real time conditions.

In accordance with another embodiment, the results of the pre-determined series of queries presented to the user after interacting with the user, comprise results which take into account the information retrieved from the various databases accessed, and associated with at least one member of a group that consists of:
  i) identifying novel business opportunities;
  ii) identifying adverse trends in a client's segments behavior that might impact revenues, key performance indicators ("KPIs") such as Average revenue per user ("ARPU"), churn, etc. related to said client's segment
  iii) identifying adverse trends in a client's segments behavior that might impact revenues, key performance indicators ("KPIs") such as Average revenue per user ("ARPU"), churn, etc. related to said client's segment;
  iv) identifying potential clients;
  iv) identifying segmentation criteria that are adapted to products which the user wishes to market;
  v) identifying needs and/or preferences of clients;
  vi) identifying changes in needs and/or preferences of clients along a selected time period;
  vii) adapting new products and/or services to clients' needs;
  viii) identifying potential business cooperation with third parties;
  ix) identifying impact of products adoption on clients segments KPIS'
  x) Route cause analysis for clients segments behavioral change; and
  xi) identifying impact of different product offer elements on segment behavior and KPIs.

According to another aspect of the disclosure, there is provided a non-transitory computer-readable storage media storing one or more sequences of instructions which when executed cause one or more processors to perform:
  a) receiving a user query;
  b) retrieving information from one or more Big Data systems by a selected computational model from a plurality of computational models which each of these computational models is configured to provide one or more answers to a different type of a user query, and the selected computational model corresponds to the query that has currently been inputted by the user; and
  c) presenting to the user a plurality of pre-determined series of queries and the results thereof, thereby reflecting to the user a multi-step process selected for retrieving one or more an answers to the query defined by that user.

According to another embodiment of this aspect, the information retrieved from one or more Big Data systems comprises data that relates to activities of a plurality of users at the Internet and/or data that relates to details of voice calls or text messages associated with a plurality of users.

In accordance with another embodiment of this aspect, the query is directed to one or more marketing aspects of the user's commercial business.

By yet another embodiment, the retrieval of information from the one or more Big Data systems and processing the retrieved information for presenting to the user the plurality of pre-determined series of queries and the results thereof, is carried out essentially under real time conditions.

BRIEF DESCRIPTION OF THE DRAWINGS

For a more complete understanding of the present invention, reference is now made to the following detailed description taken in conjunction with the accompanying drawings wherein.

DETAILED DESCRIPTION

Figure 1:
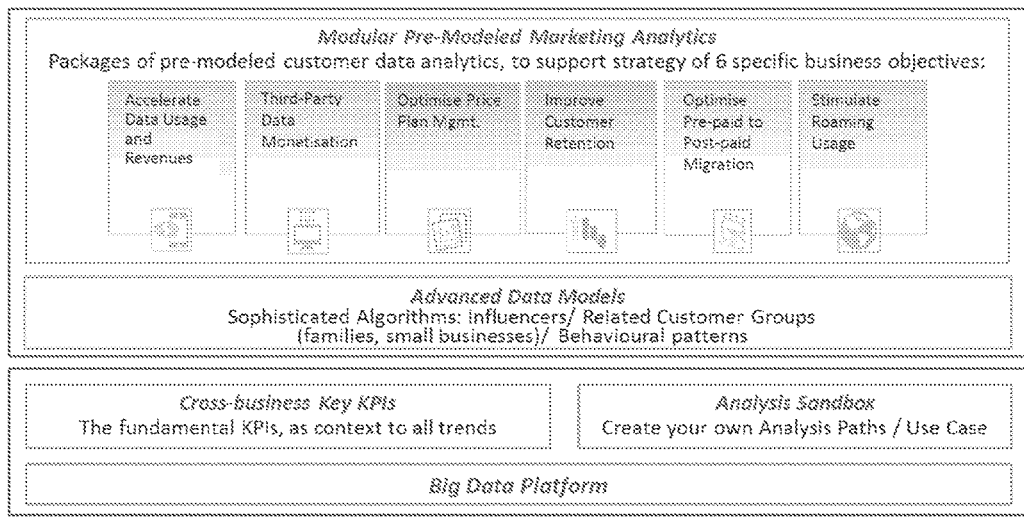
FIG. 1 presents a block diagram illustrating an example of a modular marketing model for carrying out an embodiment of the present invention.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details.

As previously explained, the present invention is concerned with extraction and proper manipulation of data that has been retrieved from big data systems. Big data systems may be described by any one or more of the following characteristics:

Volume—The quantity of data that is generated is very important in this context. It is the size of the data which determines the value and potential of the data under consideration and whether it can actually be considered as Big Data or not.

Velocity—The term 'velocity' in the context of a characteristic of Big Data refers to the speed of generation of data or how fast the data may be generated and processed to meet the demands and the challenges which lie ahead in the path of growth and development.

Variability—This is a factor which can be a problem for the data analysts. It refers to the inconsistency which can be shown by the data at times, thus hampering the process of being able to handle and manage the data effectively.

Complexity—Data management can become a very complex process especially when large volumes of data come from multiple sources. These data need to be linked, connected and correlated in order to be able to grasp the information that needs to be conveyed by these data systems.

In view of the above, it is typically recommended to develop in-house solutions which are custom-tailored to solve the companies' problem of handling Big Data, if of course the company has sufficient technical capabilities to carry out such a development.

The present disclosure provides a method and a software enabling a software user to obtain one or more answers based on information retrieved from one or more Big Data systems to a query defined by a user.

The software provided may be regarded for example as a tool that is designed to help a marketing person in obtaining answers to business related queries. To do so, the software comprises a plurality of computational models, wherein each of the plurality of computational models is configured to provide one or more answers to a different type of a user query, and each of the plurality of computational models is further configured to retrieve information from Big Data systems. In other words, the software enables the user to rely on data retrieved not only from the database of his/her organization, but instead, to do so by retrieving data from a number of data sources, including at least one big data source, from at least one Big Data system that is not necessarily part of the infrastructure of that organization, all without the need to involve professional people such as IT personnel or Business Intelligence people in the process of obtaining the required answers.

Furthermore, upon inputting the user query to the software and the retrieval of the relevant information from the Big Data systems, the user is presented with a plurality of pre-determined series of queries and the results thereof, thereby reflecting to the user a multi-step process that was selected by the software for retrieving the required answer(s) to the query defined by that user.

Such mode of operation turns the marketing process to be substantially less cumbersome that the normal processes used nowadays when one has to rely on professional people to carry out the required analysis by using a number of Big Data systems, hence the use of the software of the present invention is rather useful in both shortening the time to market of products and reaching potential clients for the products/services offered by the organization (company).

In order to improve the obtainable results, it is preferred that the information be retrieved from a number of Big Data systems (e.g. which translates to handling over 150 billion records per day) and using different types of data, e.g. data that relates to activities of people who use the Internet.

The software utilizes the retrieved data preferably for carrying out various tasks, such as constructing classification models, using classification parameters and carrying out business intelligence functionalities. Also, the software is preferably capable of using statistical models and advanced algorithms (including machine learning algorithms), which rely on the user own data as well as on data retrieved from a vast number (e.g. thousands) of Internet sources.

The output of the software which the user will receive, comprises results which take into account the information retrieved from the various databases accessed, and associated with at least one member of a group that consists of:
i) identifying novel business opportunities;
ii) identifying adverse trends in a client's segments behavior that might impact revenues, key performance indicators ("KPIs") such as Average revenue per user ("ARPU"), churn, etc. related to said client's segment;
iii) identifying potential clients;
iv) identifying segmentation criteria that are adapted to products which the user wishes to market;
v) identifying needs and/or preferences of clients;
vi) identifying changes in needs and/or preferences of clients along a selected time period;
vii) adapting new products and/or services to clients' needs;
viii) identifying potential business cooperation with third parties;
ix) identifying impact of products adoption on clients segments KPIS' x) Route cause analysis for clients segments behavioral change; and
xi) identifying impact of different product offer elements on segment behavior and KPIs.

These outputs assist the marketing people to improve their marketing planning.

One way of achieving this functionality of the software is by using modular packages, each focused on a different business problem. For example, How should the use (and profitability) be increased from data conveyance;

How to improve clients' preservation and avoiding their turn to a different supplier;

How to identify potential business cooperation with third parties; and the like.

FIG. 1 presents a block diagram illustrating an example of a modular marketing model for carrying out an embodiment of the present invention. In this Fig. there is provided an example of using packages (computational models) of pre-modeled customer data analytics that support various business objectives of a telecom provider, and a general way for retrieving the information that will be applied by these packages in order to provide the user the information for the query inputted. The packages exemplified in this Fig. are accelerate data usage and revenues, third-party data monetization, optimized management of price plans, improving customer preservation, optimizing pre-paid to post-paid migration and stimulating roaming usage.

Optionally, the software is capable of establishing relationships between clients that are included as individuals in the Big Data systems, e.g. individuals belonging to the same family, individual belonging to the same social circle, a group of small businesses, etc. and then apply data known for one (or more) members of the group onto other members of that group, in order to achieve the desired information.

Figure 2:
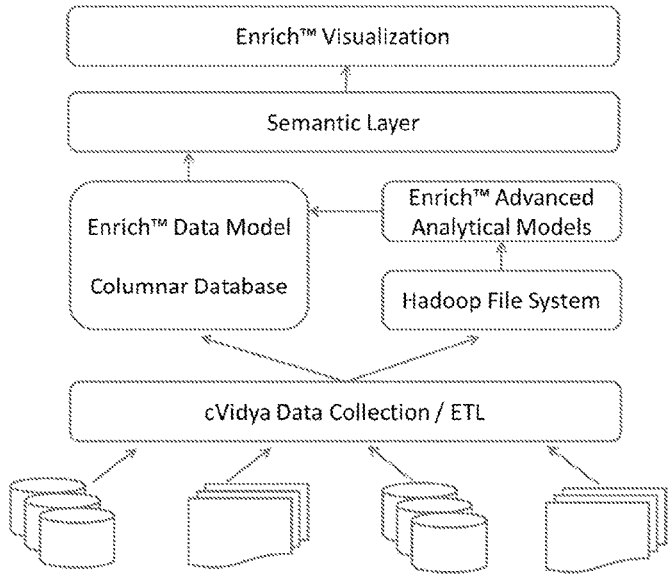
FIG. 2 presents a block diagram of a software layered structure according to an embodiment of the invention.

FIG. 2 presents a schematic diagram of different layers in a software construed according to an embodiment of the invention.

The first layer is the data collection layer at which vast quantities of data (e.g. files) that were generated at different platforms, at different formats and at different volumes, are retrieved, processed and loaded to a database.

The second layer is the data storage layer in which the data collected is stored in a Big Data columnar database, in a way that enables fast storage and retrieval of the data. Optionally, this second layer comprises a number of sub-layers. The first, for storing collected data for a pre-defined period of time (e.g. 30 days) and the second sub-layer for storing data that is used for running the algorithms in the analysis process for providing the answers to the user's query, and for forwarding data towards the application layer.

In order to allow construction and running of the algorithms and the models, it is necessary to store raw data (relating to calls, sms, data usage (for example, surfing data), and the like) for the pre-defined period of time. Preferably, this is done by using Hadoop system, which allows writing and scanning of large files in an efficient way. This sub-layer allows executing programs without adversely affecting the performance of the parallel processing that is carried out at the same time.

Optionally but not necessarily, there is another layer, a semantic (adaptation) layer located between the application (visualization) layer and the data storage layer. The use of such an optional layer eliminates the dependency in one database as well as it eliminates the need to adapt the application to any specific database.

The next layer is the data modelling layer, which is adapted to support queries initiated by the users and to enable a fast and efficient reconstruction of a model for the end user. Preferably, the data model layer provides a generic solution but also allows certain flexibility to better tailor the software to the user's specific needs.

The next layer is the advanced analytical models' layer in which algorithms (e.g. machine learning algorithms) are used to enable creating new characteristics of the clients. Preferably, these models use raw data available, taking into consideration the data relevant to the full population and not to just a representative sample thereof.

The uppermost layer is the application (visualization) layer, which is used by the software for interacting with the user. In this example, this layer includes the following:

Main key performance indicators (KPIs)—presenting reports of general trends in the business such as current clients/subscribers, new clients, clients who had left the company, average revenue per user (ARPU), average revenues from voice calls and from data sessions, and the like.

Navigation between different modular packages, wherein each of these packages is focused on a different query (e.g. a different business related query).

Dynamic filters that enable the end user to perform different analysis of the available data, based on his/her needs.

Different analysis functionalities that enable the user to have different views and to gain insights on the data being analyzed (e.g. comparison with different segments, reorder analysis dimensions, view trends, change graphs, etc.)

Enable the user to track and save a selected segment for future use.

Share segments and analysis with other users.

Export lists of clients from analyzed segments

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

In addition, it should be understood that although the examples provided in the present disclosure are mainly taken from the telecommunication field, still, the present invention is not limited to the telecommunication field of technology. It also encompasses non-telecommunication fields, such as for example the retail field, where the information may be derived from data on purchases history, or the utility field where the information may be derived from past data retrieved from readings of smart meters, and the like. The scope of the invention is limited only by the following claims.

The invention claimed is:

1. A method comprising:
   a) providing a software that comprises:
      a data collection layer at which data sets generated at different platforms are retrieved, processed and loaded to a database,
      a data storage layer in which the data sets from the data collection layer are stored in a Big Data database,
      a data modeling layer having a plurality of predefined computational models for different business problems, wherein each computational model of the plurality of predefined computational models is configured to use the data sets stored in the Big Data database to provide one or more answers to a different type of a user query specific to a business problem of the different business problems, and
      a visualization layer for interacting with a user,
      wherein the different types of user queries specific to the different business problems include:
         accelerate data usage and revenues,
         third-party data monetization,
         optimized management of price plans,
         improving customer preservation,
         optimizing pre-paid to post-paid migration, and
         stimulating roaming usage;
   b) upon inputting a user query to the software, using one of the computational models of the plurality of predefined computational models for presenting to a user a plurality of pre-determined series of queries and results thereof, thereby reflecting to the user a multi-step process selected by the software for retrieving the one or more answers to the user query.

2. The method of claim 1, wherein the data sets include data that relates to activities of a plurality of users at the Internet.

3. The method of claim 1, wherein the data sets include data that relates to details of voice calls or text messages associated with a plurality of users.

4. The method of claim 1, wherein the user query is directed to one or more marketing aspects of the user's commercial business.

5. A non-transitory computer-readable storage media storing one or more sequences of instructions which when executed cause one or more processors to perform a method comprising:
   a) providing a software that comprises:
      a data collection layer at which data sets generated at different platforms are retrieved, processed and loaded to a database,
      a data storage layer in which the data sets from the data collection layer are stored in a Big Data database,
      a data modeling layer having a plurality of predefined computational models for different business problems, wherein each computational model of the plurality of predefined computational models is configured to use the data sets stored in the Big Data database to provide one or more answers to a different type of a user query specific to a business problem of the different business problems, and
      a visualization layer for interacting with a user,
      wherein the different types of user queries specific to the different business problems include:
         accelerate data usage and revenues,
         third-party data monetization,
         optimized management of price plans,
         improving customer preservation,
         optimizing pre-paid to post-paid migration, and
         stimulating roaming usage;
   b) upon inputting a user query to the software, using one of the computational models of the plurality of predefined computational models for presenting to a user a plurality of pre-determined series of queries and results thereof, thereby reflecting to the user a multi-step process selected by the software for retrieving the one or more answers to the user query.

6. The non-transitory computer-readable storage media of claim 5, wherein the data sets include data that relates to activities of a plurality of users at the Internet and/or data that relates to details of voice calls or text messages associated with a plurality of users.

7. The non-transitory computer-readable storage media of claim 5, wherein the user query is directed to one or more marketing aspects of the user's commercial business.

* * * * *